US010021256B2

United States Patent
Tanaka

(10) Patent No.: US 10,021,256 B2
(45) Date of Patent: Jul. 10, 2018

(54) APPARATUS SYSTEM, AND METHOD FOR SETTING ITEMS WITH VALUES THAT ARE INPUT AT AN EXECUTION TIME OF A WORKFLOW

(71) Applicant: Kensuke Tanaka, Kanagawa (JP)

(72) Inventor: Kensuke Tanaka, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/071,169

(22) Filed: Mar. 15, 2016

(65) Prior Publication Data

US 2016/0277607 A1    Sep. 22, 2016

(30) Foreign Application Priority Data

Mar. 20, 2015    (JP) .................. 2015-057338

(51) Int. Cl.
G06F 3/12     (2006.01)
H04N 1/00     (2006.01)
(Continued)

(52) U.S. Cl.
CPC ....... *H04N 1/00424* (2013.01); *G06F 3/0482* (2013.01); *G06F 3/0486* (2013.01); *G06F 17/30011* (2013.01); *G06Q 10/0633* (2013.01); *H04N 1/00474* (2013.01); *H04N 1/00482* (2013.01); *H04N 2201/0094* (2013.01)

(58) Field of Classification Search
CPC .......... H04N 1/32523; H04N 1/00244; H04N 1/00347; H04N 1/00517; H04N 2201/0031; H04N 2201/0077; H04N 1/00474; H04N 1/00482; H04N 2201/0094; G06F 3/0486;
(Continued)

(56) References Cited

U.S. PATENT DOCUMENTS 8,179,542 B2    5/2012    Yagi
8,468,213 B2 *  6/2013    Kamata ............. H04N 1/00222
                                                        358/1.1
(Continued)

FOREIGN PATENT DOCUMENTS

JP    2008-097586      4/2008
WO    2014022919 A1    2/2014

OTHER PUBLICATIONS

European Patent Office Search Report; Ricoh Company, Ltd. Application No. 16160314.7-1958; Jun. 3, 2016.

*Primary Examiner* — Gabriel Garcia
(74) *Attorney, Agent, or Firm* — Duft Bornsen & Fettig LLP

(57) ABSTRACT

An information processing apparatus includes an item-management unit for, in a first screen including a list of setting items whose values are input at a workflow execution time, when an operation is performed for a first setting item of the setting items, including a first item corresponding to the first setting item in a second screen, and an input unit for, when another operation is performed for applying the first item included in the second screen to a setting area of a value of a second setting item of a first process of one or more processes of the workflow included in a third screen, inputting a character string to the setting area of the value of the second setting item, the character string indicating that the value input at the workflow execution time is referred to as the value of the second setting item.

9 Claims, 16 Drawing Sheets

(51) Int. Cl.
*G06F 17/30* (2006.01)
*G06Q 10/06* (2012.01)
*G06F 3/0482* (2013.01)
*G06F 3/0486* (2013.01)

(58) Field of Classification Search
CPC ............. G06F 3/0482; G06F 17/30011; G06Q 10/0633
USPC .................................................. 358/1.1–1.18
See application file for complete search history.

(56) References Cited

U.S. PATENT DOCUMENTS

| | | | |
|---|---|---|---|
| 2007/0150834 A1* | 6/2007 | Muller | G06F 3/04817 715/810 |
| 2010/0177341 A1 | 7/2010 | Mihara | |
| 2011/0007356 A1 | 1/2011 | Matsuura | |
| 2011/0051178 A1* | 3/2011 | Kono | H04N 1/00416 358/1.15 |
| 2011/0181900 A1* | 7/2011 | Suese | H04N 1/00413 358/1.13 |
| 2015/0082320 A1* | 3/2015 | Hori | G06Q 10/06 718/107 |

* cited by examiner

FIG.8

ATTRIBUTE – CHARACTER TYPE

GENERAL

| | | | 631 |
|---|---|---|---|
| EDITABILITY | ○ False | ● True | |
| INPUT REQUIRED | ● False | ○ True | |
| DISPLAY NAME | CONTRACT PARTY | | |
| TAG NAME | text1 | | |

CHARACTER TYPE

| | | | 632 |
|---|---|---|---|
| MAXIMUM LENGTH | 20 | | |
| PASSWORD | ● False | ○ True | |
| VERIFICATION STRING | | | |

630

OK    CANCEL

| DISPLAY NAME | TAG NAME |
|---|---|
| DOCUMENT NAME | doc_name |
| ... | ... |
| NUMBER OF PAGES | page_num |
| ... | ... |
| HOST ADDRESS | host_address |
| USER NAME | user_name |
| BELONGING TO | dep1 |
| DESCRIPTION | text1 |
| OCR PROCESSING | ocrData_01 |
| BARCODE READ | bc_Data_01 |

APPARATUS SYSTEM, AND METHOD FOR SETTING ITEMS WITH VALUES THAT ARE INPUT AT AN EXECUTION TIME OF A WORKFLOW

CROSS-REFERENCE TO RELATED APPLICATION

The present application is based on and claims the benefit of priority of Japanese Priority Application No. 2015-057338 filed on Mar. 20, 2015, the entire contents of which are hereby incorporated herein by reference.

BACKGROUND OF THE INVENTION

1. Field of the Invention

The present invention relates to an information processing apparatus, an information processing system, and an information processing method.

2. Description of the Related Art

Conventionally, there is an information processing system in which a predefined workflow can be executed for image data scanned from a document (hereinafter, referred to as "scanned image") by an image forming apparatus.

In order to execute a workflow, it is necessary that workflow definition information is created beforehand. The workflow definition information includes information indicating a procedure relationship of processes included in the workflow, setting information related to the processes, etc. It is heavy work load for a user to directly edit the workflow definition information even if it is written in a text format because it is information for a computer program to interpret. Therefore, a graphical user interface (GUI) for supporting workflow definition information editing is provided.

FIG. 1 is a drawing illustrating an example of a workflow definition information setting screen 510. The setting screen 510 shown in FIG. 1 includes a list area 511, a flow setting area 512, etc.

The list area 511 includes icons of processes which can be selected as an element of a workflow. The flow setting area 512 is used for setting procedure relationship of the processes (in other words, flow of workflow processing). For example, a user can drag-and-drop a display part corresponding to a process in the list area 511 into the flow setting area 512 in order to make the process be an element of a workflow. Further, a user can set a connection relationship of display parts corresponding to the processes in order to set the procedure relationship of the processes.

Further, for example, if a user double-clicks a display part in the flow setting area 512, then a setting screen for a process corresponding to the display part is displayed.

FIG. 2 is a drawing illustrating an example of a setting screen 520 for a process. The setting screen 520 in FIG. 2 is an example of a setting screen related to "mail delivery" in the flow setting area 512 in FIG. 1.

For example, a setting area 521 is a setting area of a destination address. Further, a setting area 522 is a setting area for a name of an attached document. Further, a setting area 523 is a setting area for a message text.

As described above, a user can edit workflow definition information with an intuitive operation by using a GUI as shown in FIG. 1 and FIG. 2.

Technical Problem

However, the conventional operation is not good enough in terms of reference setting in which, in a case where a value of a setting item of a process is determined at the time of workflow execution, the value is set in a reference form. Such a case includes where the value of the setting item is data input by a user at the time of workflow start, and where the value of the setting item is data output from a process.

For example, in the setting area 522, "contract {num}" is set. Here, "{num}" indicates referring to a value of a setting item input by a user at the time of workflow start. Further, in the setting area 523, "contact address is {text1}" is set. Here, "{text1}" indicates referring to a character string extracted from an area of a scan image in an OCR process performed prior to the mail delivery. In other words, FIG. 2 illustrates an example of a grammatical (description) rule in which a name of a parameter is placed between curly brackets { } when the value of the parameter is being referred to.

In this case, it is necessary for a user to know such a grammatical rule and a name of a parameter beforehand by referring to a manual, etc. Further, even if a user knows them well, it is still a burden for the user to manually input the name of the parameter in a form according to the grammatical rule.

In view of the above, an object of the present invention includes simplifying a setting operation for setting a reference-form value which refers to a dynamic value as a setting value of a process included in a workflow.

CITATION LIST

Patent Document

[Patent Document 1] Japanese Laid-Open Patent Application No. 2008-097586

SUMMARY OF THE INVENTION

An information processing apparatus is provided. The information processing apparatus includes an item management unit configured to, in a first screen including a list of a plurality of setting items whose value is input at an execution time of a workflow, when a first operation is performed for a first setting item of the setting items, include a first item corresponding to the first setting item in a second screen; and an input unit configured to, when a second operation is performed for applying the first item included in the second screen to a setting area of a value of a second setting item of a first process of one or more processes of the workflow included in a third screen, input a first character string to the setting area of the value of the second setting item, the first character string indicating that the value input at the execution time of the workflow is referred to as the value of the second setting item.

According to an embodiment of the present invention, it is possible to simplify a setting operation for setting a reference-form value which refers to a dynamic value as a setting value of a process included in a workflow.

Other objects, features and advantages of the present invention will become more apparent from the following detailed description when read in conjunction with the accompanying drawings.

BRIEF DESCRIPTION OF THE DRAWINGS

FIG. 8 is a drawing illustrating a display example of a character type setting screen.

FIG. 10 is a drawing illustrating an example of a bibliography list storage unit.

DETAILED DESCRIPTION OF THE PREFERRED EMBODIMENTS

Figure 1:
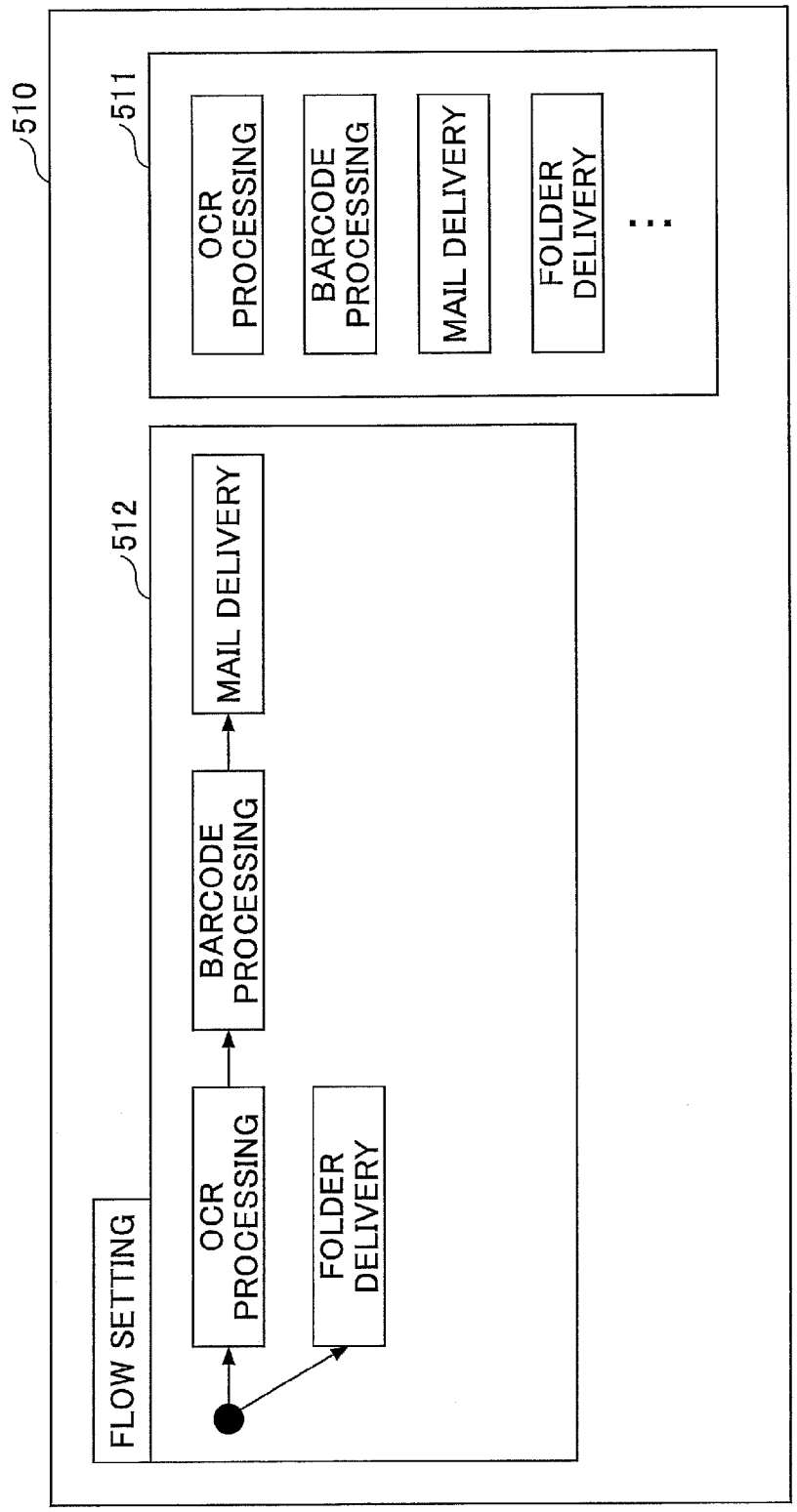
FIG. 1 is a drawing illustrating an example of a workflow definition information setting screen.
Figure 2:
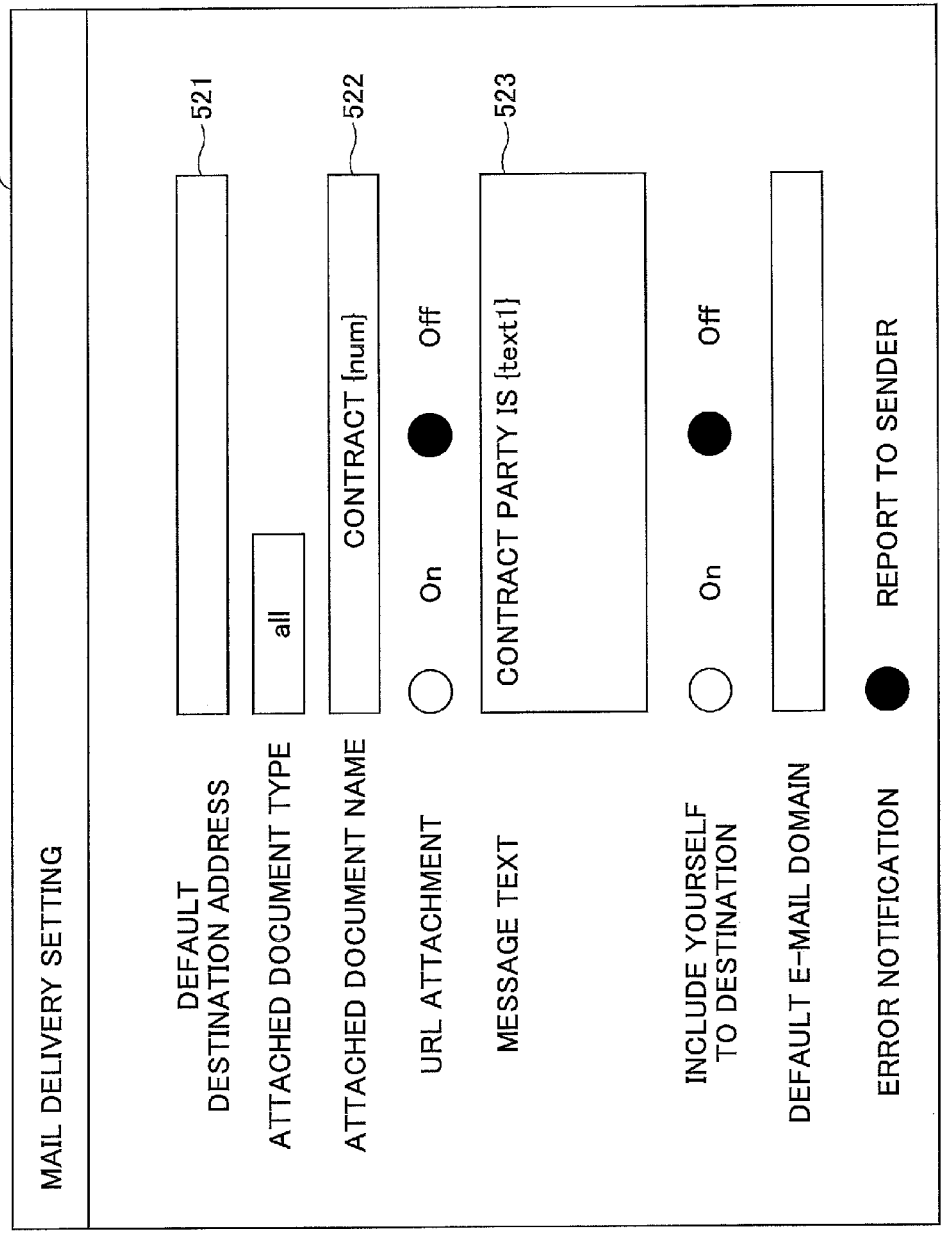
FIG. 2 is a drawing illustrating an example of a setting screen for a process.
Figure 3:
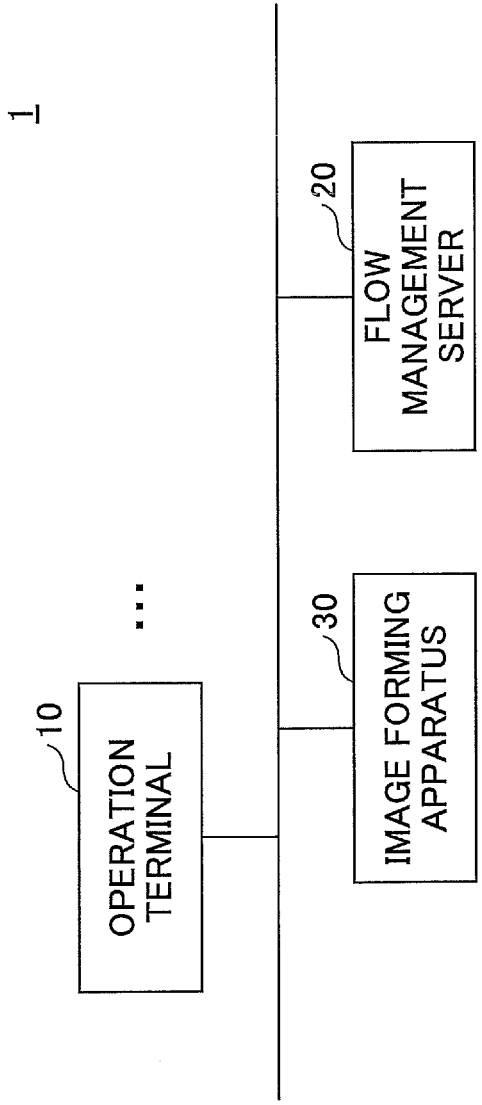
FIG. 3 is a drawing illustrating a configuration example of an information processing system according to an embodiment of the present invention.

In the following, embodiments of the present invention will be described by referring to the drawings. FIG. 3 is a drawing illustrating a configuration example of an information processing system 1 according to an embodiment of the present invention. In FIG. 3, the information processing system 1 includes, for example, a flow management server 20, one or more operation terminals 10, and one or more image forming apparatuses 30. These are connected to each other via a network (regardless of wired or wireless) including a LAN (Local Area Network), the Internet, etc., and capable of communicating with each other.

The flow management server 20 is a computer which executes a predefined workflow related to data received via a network. A workflow is, for example, a flow of a process (a process flow) which is realized by any combination of one or more processes (tasks) each of which accomplishes a closed function independently or individually. A workflow according to an embodiment of the present invention includes, for example, a combination of a data input process, data processing process, and data output process. For example, in a workflow performed in response to reception of image data obtained by scanning a document at an image forming apparatus 30 (hereinafter, referred to as "scan image"), the reception of the scan image corresponds to a data input process, image processing of the scan image corresponds to a data processing process, and transmission of email including the scan image or a result of image processing of the scan image corresponds to a data output process. It should be noted that the process may be referred to as "activity" in general workflow terminology.

The image forming apparatus 30 is equipment including a scanner or a multifunction peripheral which functions as a data input source for a workflow. For example, a user selects a workflow as an execution target by using an operation panel of the image forming apparatus 30, and instructs the image forming apparatus 30 to scan a document. According to the instruction, the image forming apparatus 30 scans the document to generate image data, and transmits to the flow management server 20 the image data (scan image) and identification information of a workflow selected as an execution target (hereinafter, referred to as "flow ID"). The flow management server 20 performs a workflow job identified by the flow ID (hereinafter, referred to as "flow job") for the scan image.

The operation terminal 10 is a terminal operated when workflow definition information is generated. For example, a personal computer (PC), a tablet terminal, a smartphone, etc., may be used as the operation terminal 10.

Figure 4:
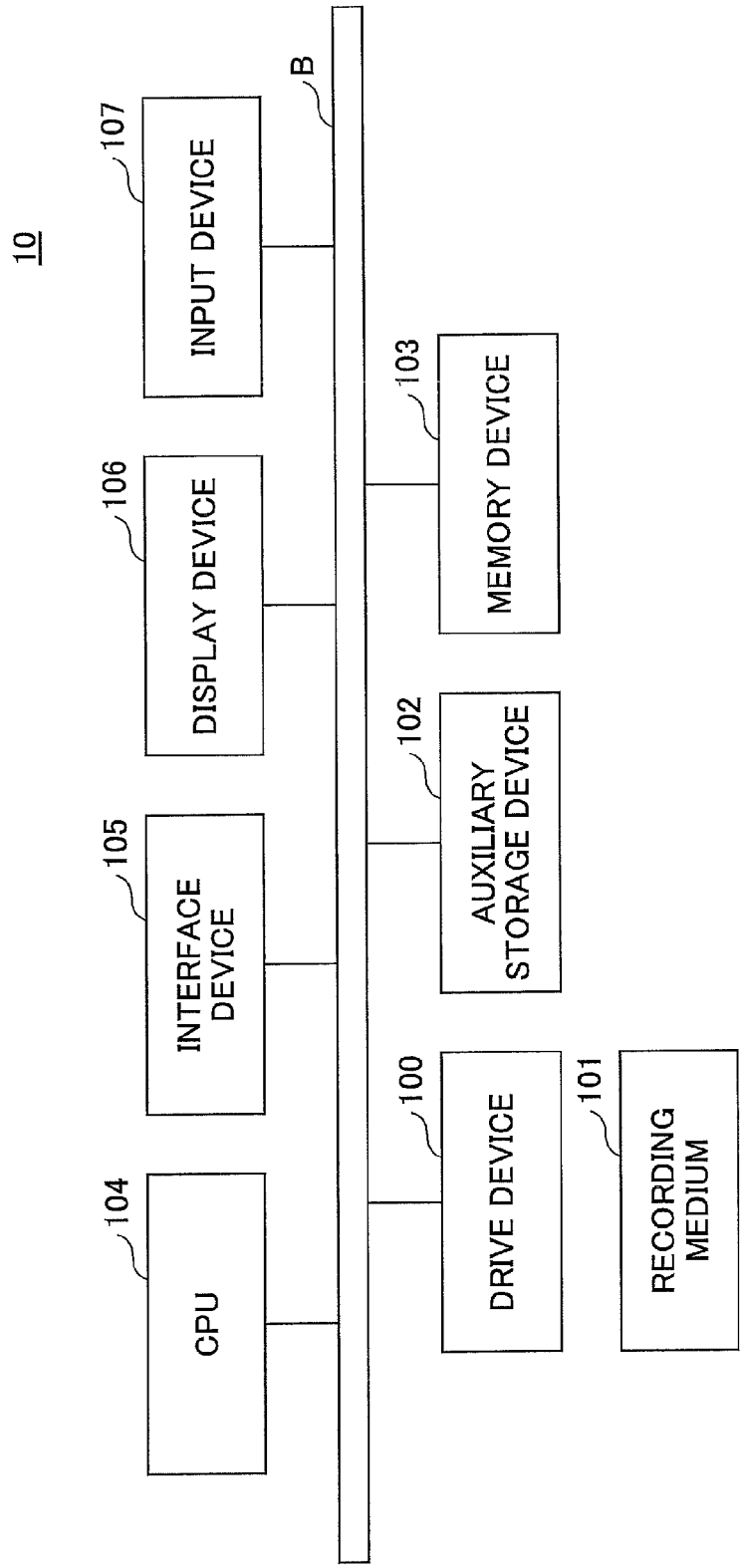
FIG. 4 is a drawing illustrating a hardware configuration example of an operation terminal according to an embodiment of the present invention.

FIG. 4 is a drawing illustrating a hardware configuration example of the operation terminal 10 according to an embodiment of the present invention. The operation terminal 10 includes a drive device 100, an auxiliary storage device 102, a memory device 103, a CPU 104, an interface device 105, a display device 106, an input device 107, etc., which are connected to each other by a bus B.

A program by which a process is realized in the operation terminal 10 is provided by a recording medium 101 such as a CD-ROM, etc. When a recording medium 101 which stores the program is set in the drive device 100, the program is read from the recording medium 101 and installed in the auxiliary storage device 102 via the drive device 100. However, it is not always required that the program is installed from the recording medium 101, but may be downloaded from another computer via a network. The auxiliary storage device 102 stores not only the installed program but also necessary files, data, etc.

The memory device 103 stores the program read from the auxiliary storage device 102 when a program start-up instruction is received. The CPU 104 causes functions of the operation terminal 10 to be realized according to the program stored in the memory device 103. The interface device 105 is used for an interface for connecting to a network. The display device 106 displays a graphical user interface (GUI), etc., according to the program. The input device 107 includes a keyboard, a mouse, or the like, and is used for inputting various operational instructions.

It should be noted that the flow management server 20 may also have a hardware configuration as shown in FIG. 4. In this case, the flow management server 20 may not include a display device 106 and an input device 107.

Figure 5:
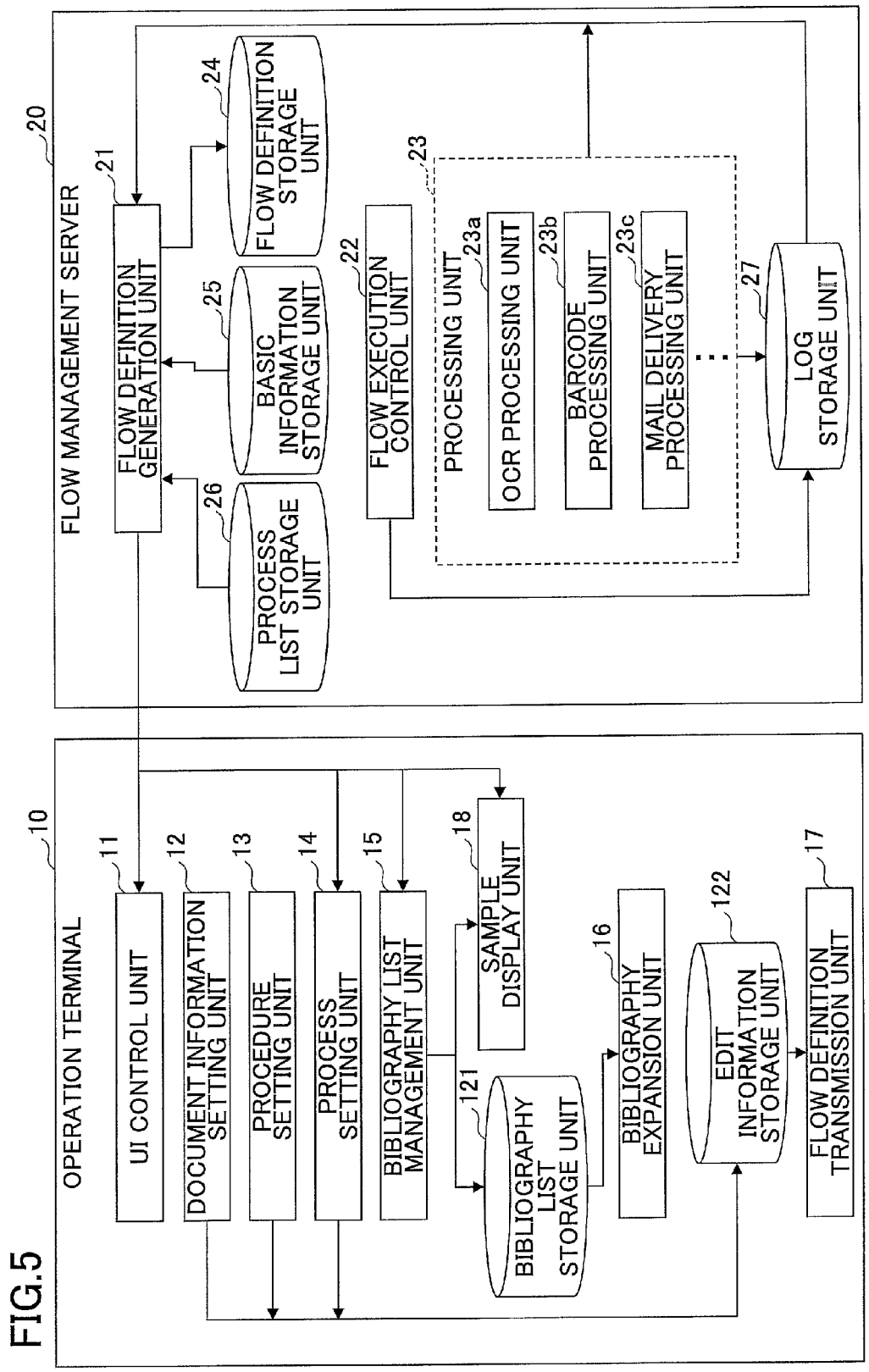
FIG. 5 is a drawing illustrating a functional configuration of a flow management server and an operation terminal.

FIG. 5 is a drawing illustrating a functional configuration of a flow management server 20 and an operation terminal 10. In FIG. 5, the flow management server 20 includes, for example, a flow definition generation unit 21, a flow execution control unit 22, and a processing unit 23. These units are realized by processes which one or more programs installed in the flow management server 20 cause a CPU of the flow management server 10 to execute. The flow management server 20 also uses, for example, a flow definition storage unit 24, a basic information storage unit 25, a process list storage unit 26, and a log storage unit 27. These storage units can be realized by using, for example, the auxiliary storage device 102, or storage devices connected to the flow management server 20 via a network.

The flow definition generation unit 21 performs processes for supporting or assisting a flow definition information generation process (edit process) of the operation terminal 10. For example, the flow definition generation unit 21 provides information necessary for flow definition information generation to the operation terminal 10. The flow definition information is generated for each of workflows (each of flow IDs), and includes definition information related to flow of workflow processing. The generated flow definition information is stored in the flow definition storage unit 24.

Figure 6:
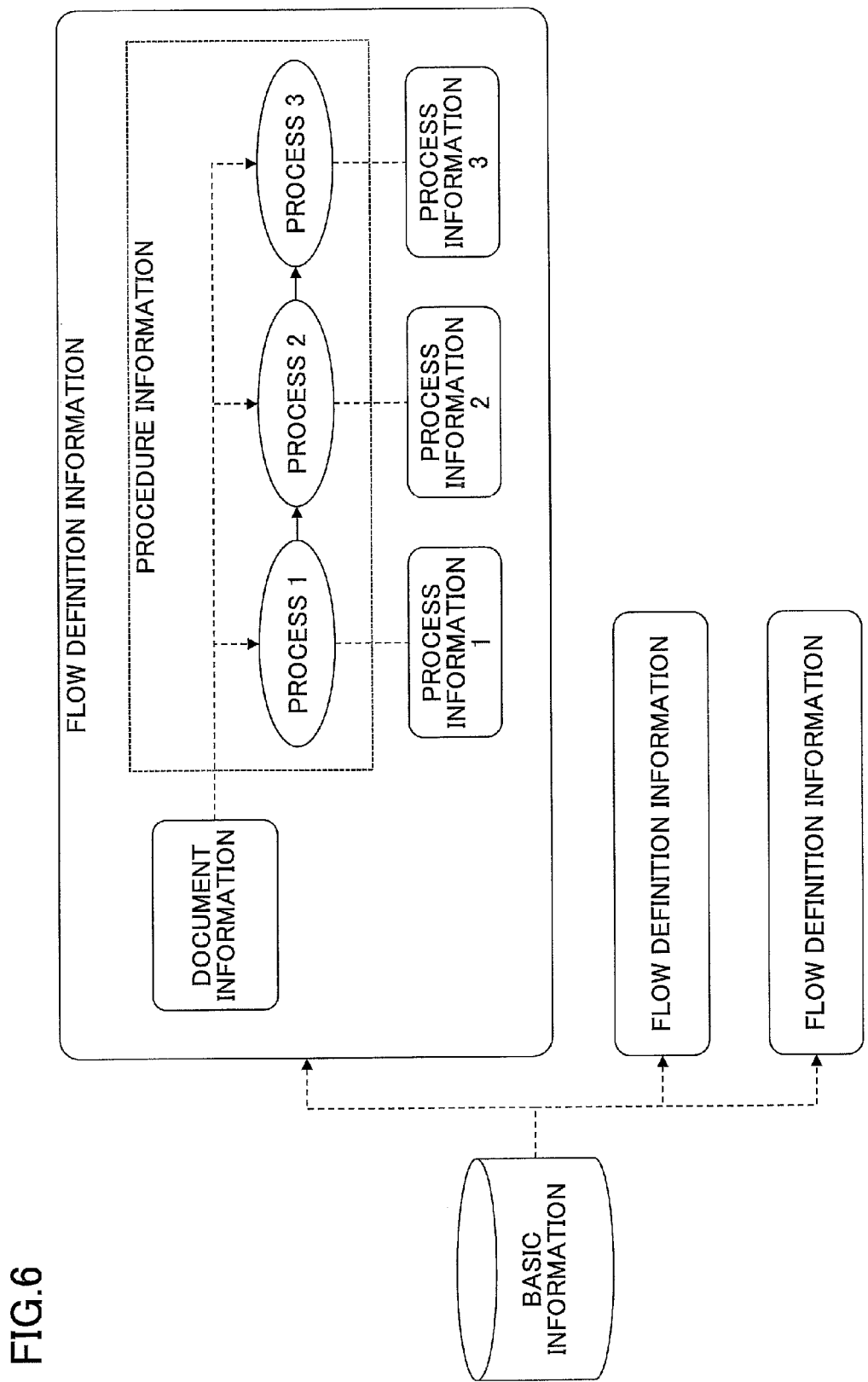
FIG. 6 is a drawing illustrating an example of flow definition information according to an embodiment of the present invention.

FIG. 6 is a drawing illustrating an example of flow definition information according to an embodiment of the present invention. As shown in FIG. 6, the flow definition information includes, for example, document information, procedure information, and process information for each of the processes.

The document information is related to a set of setting items whose values are input by a user when a flow job starts. In other words, setting items whose values are input by a user at the time of flow start can be defined for each workflow.

The procedure information is related to a flow of processes (procedure relationship of processes). In FIG. 6, an example is shown in which three processes are serially connected. The procedure relationship of processes is not limited to the one shown in FIG. 6.

The process information is a set of setting values of setting items of a process.

Further, in FIG. 6, basic information is shown as information separated from the flow definition information. The basic information is a set of parameters cross-cuttingly related to multiple pieces of flow definition information (i.e., multiple workflows). For example, setting items of basic information may include a user name, a number of pages of scan image, date and time, etc. Parameters included in the basic information can be referred to in setting values of setting items of a process. Further, the parameters included in the basic information may be referred to in the logic (in source code) of a process.

Returning to FIG. 5, according to a workflow execution request from the image forming apparatus 30, the flow execution control unit 22 controls execution of the flow job related to the scan image included in the execution request based on flow definition information stored in the flow definition storage unit 24 and corresponding to a flow ID included in the execution request.

The processing unit 23 performs processes (activities) included in the work flow. For example, one process is executed by one processing unit 23. Therefore, a work flow is realized by connections of processes executed by one or more processing units 23 whose processes are different from each other. However, it should be noted that the same process may appear twice or more than twice in a single work flow. The flow execution control unit 22 requests the processing units 23 to execute corresponding processes according to the procedure of processes defined in the flow definition information.

In FIG. 5, as an example of a processing unit 23, an OCR processing unit 23*a*, a barcode processing unit 23*b*, and a mail delivery processing unit 23*c* are shown. The OCR processing unit 23*a* performs an OCR process for the scan image. The barcode processing unit 23*b* extracts information embedded in a barcode included in the scan image. The mail delivery processing unit 23*c* transmits the scan image to an address set in the process information corresponding to the mail delivery processing unit 23*c*. It should be noted that each of the processing units 23 may be realized by a process which a corresponding independent program module (e.g., plugin) causes a CPU of the flow management server 20 to perform.

The log storage unit 27 stores log information generated by the process execution control unit 22 or the processing units 23 at the time of flow job execution.

The basic information storage unit 25 stores attribute information of parameters included in the basic information. The process list storage unit 26 stores attribute information of processing units 23. More specifically, the process list storage 26 stores attribute information of plugins installed in the flow management server 20, which plugins cause the CPU of the flow management server 20 to function as the processing units 23.

The operation terminal 10 includes a UI control unit 11, a document information setting unit 12, a procedure setting unit 13, a process setting unit 14, a bibliography list management unit 15, a bibliography expansion unit 16, a flow definition transmission unit 17, a sample display unit 18, etc. These units are realized by processes which one or more programs installed in the operation terminal 10 cause the CPU 104 to perform. Or, these units may be realized based on hyper text markup language (HTML) data, a script, etc., included in a Web page downloaded from the flow management server 20.

The operation terminal 10 also uses a bibliography list storage unit 121 and an edit information storage unit 122. These storage units can be realized by using, for example, the auxiliary storage device 102, the memory device 103, or storage devices capable of connecting to the operation terminal 10 via a network.

The UI control unit 11 displays various screens for editing the flow definition information on the display device 106. The document information setting unit 12 performs a setting process of document information related to the flow definition information of an edit target (generation target). The procedure setting unit 13 performs a setting process of procedure information related to the flow definition information of the edit target. The process setting unit 14 performs a setting process of process information of the process related to the flow definition information of the edit target.

The bibliography list management unit 15 controls a set of parameters or setting items (hereinafter, referred to as "bibliography list") selected by a user from a list of parameters included in the document information or setting items included in the basic information as a parameter or a setting item which may be quoted (referred to) as a value of a setting item of a process included in the workflow. The parameters or setting items included in the bibliography list are referred to as bibliographical information items. The bibliographical information (i.e., bibliography list) is stored in the bibliography list storage unit 121.

The bibliography expansion unit 16 performs a process for referring to a bibliographical information item, selected by a user from a bibliography list stored in the bibliography list storage unit 121, as a value of a setting item included in process information of a process.

The edit information storage unit 122 stores flow definition information being edited. The flow definition transmission unit 17 transmits to the flow definition generation unit 21 the flow definition information stored in the edit information storage unit 122 after the end of editing. The flow definition generation unit 21 stores the flow definition information received from the flow definition transmission unit 17 in the flow definition storage unit 24.

The sample display unit 18 will be described later.

Editing of the flow definition information will be described. The editing of the flow definition information starts from a flow definition edit screen displayed by the UI control unit 11 of the operation terminal 10.

Figure 7:
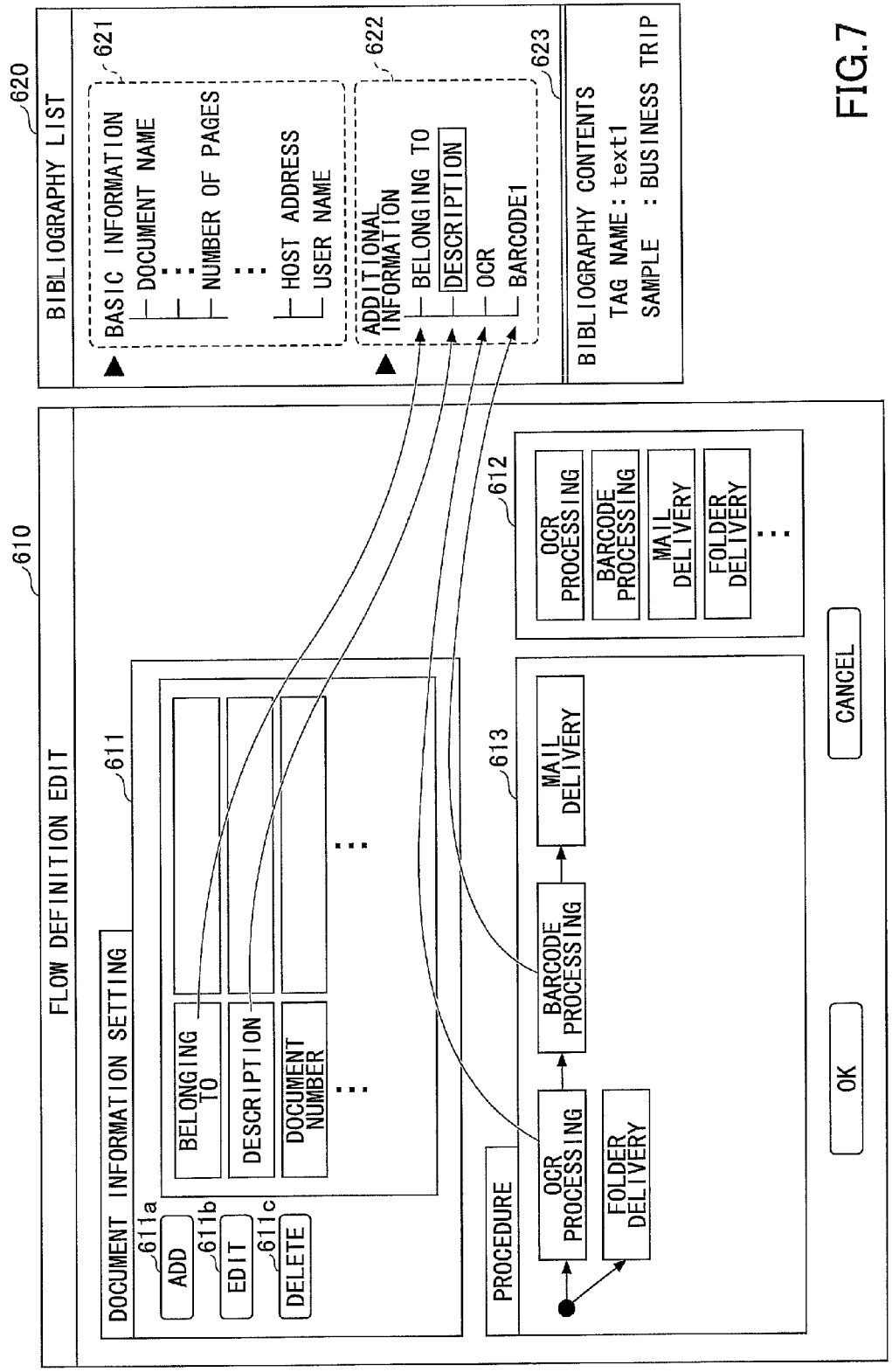
FIG. 7 is a drawing illustrating a display example of a flow definition edit screen.

FIG. 7 is a drawing illustrating a display example of a flow definition edit screen 610. In FIG. 7, the flow definition edit screen 610 includes a document information setting area 611, a process list area 612, a procedure setting area 613, etc.

The document information setting area 611 is an area for selection of adding, editing, deleting, etc., of a setting item included in the document information. The document information setting area 611 includes an add button 611a, an edit button 611b, a delete button 611c, etc.

When the add button 611a is selected, the document information setting unit 12 displays a screen (dialog) for setting a data type of a setting item to be added as the document information. In the screen for setting a data type, various data types may be selected including a character type, a numerical type, a selective type, etc. For example, when a character type is selected, the document information setting unit 12 displays a character type setting screen.

FIG. 8 is a drawing illustrating a display example of a character type setting screen 630. In FIG. 8, the character type setting screen 630 includes a general attribute setting area 631, a character type attribute setting area 632, etc.

The general attribute setting area 631 is an area for setting attribute information common to setting items of all data types (hereinafter, referred to as "general attributes"). The general attributes include edit availability, input-required, display name, tag name, etc.

The edit availability is an attribute indicating whether a value can be changed by a user at the time of workflow execution. The input-required is an attribute indicating whether input of a value is required at the time of workflow execution. The display name is an identification name of a setting item used for display. The tag name is identification information of a setting item used by a program (the flow execution control unit 22, the processing unit 23, etc.,) to distinguish the setting item.

The general attribute setting area 632 is an area for setting attribute information specific to setting items of the character type (hereinafter, referred to as "character type attribute"). The character type attributes include maximum length, password-or-non-password, a character string for verification in case of password (i.e., password), etc.

In the character type setting screen 630, when values of setting items are set and an OK button 633 is pressed, the document information setting unit 12 adds a line corresponding to a new setting item in the document information setting area 611 and stores, in the edit information storage unit 122, attribute information related to the setting item input in the character type setting screen 630. A display name of the setting item, for example, is displayed in the line. In FIG. 7, a line including "belonging to" and a line including "description" are shown as an example. These lines are added as described above.

When the edit button 611b is selected in a state where a line is selected, the document information setting unit 12 displays a setting screen corresponding to a setting item associated with the line. For example, if the setting item is a character type, then the character type setting screen 630 is displayed. A user can change existing attribute information of the setting item by using the displayed setting screen 630.

When the delete button 611c is selected in a state where a line is selected, the document information setting unit 12 deletes the line. In other words, the setting item corresponding to the line is removed from elements of the document information.

The process list area 612 is an area including icons of processes which can be selected as an element of a workflow. The UI control unit 11 requests the flow definition generation unit 21 of the flow management server 20 for list information of plugins installed in the flow management server 20. The flow definition generation unit 21 obtains the list information from the process list storage unit 26 and returns it to the UI control unit 11. The UI control unit 11 displays the process list area 612 based on the list information.

The procedure setting area 613 is an area for setting procedure information. For example, when a user drags and drops a display part corresponding to a process in the process list area 612 into the flow setting area 512, the procedure setting unit 13 puts an icon corresponding to the process in the procedure setting area 613. Further, when a user operates icons in the procedure setting area 613 and sends an instruction to set a connection relationship between the icons, the procedure setting unit 13 sets the connection relationship (procedure relationship) between the processes corresponding to the operated icons. Settings in the procedure setting area 613 are stored as procedure information in the edit information storage unit 122.

In FIG. 7, a bibliography list screen 620 is displayed next to the flow definition edit screen 610. The bibliography list screen 620 is displayed, for example, at the same time when the flow definition edit screen 610 is displayed. Or, the bibliography list screen 620 may be displayed according to a predefined operation in the flow definition edit screen 610.

A bibliography list is shown in the bibliography list screen 620. In FIG. 7, the bibliography list screen 620 includes a basic information display area 621, an additional information display area 622, etc. In the basic information display area 621, display names of parameters included in the basic information are shown. For example, the bibliography list management unit 15 requests the flow definition generation unit 21 of the flow management server 20 to provide the basic information. The flow definition generation unit 21 returns to the bibliography list management unit 15 the basic information stored in the basic information storage unit 25. The bibliography list management unit 15 puts display names of the parameters included in the basic information in the basic information display area 621 based on the basic information. Further, the bibliography list management unit 15 stores in the bibliography list storage unit 121 attribute information of the parameters included in the basic information as the bibliographical information included in the bibliography list.

The additional information display area 622 is an area in which a display name of a setting item, of the setting items corresponding to the lines in the document information setting area 611, added to the bibliography list, is shown; or, a display name of a parameter indicating output data of a process, of the processes in the procedure setting area 613, added to the bibliography list, is shown. FIG. 7 shows an example in which "belonging to", "description", "OCR", and "barcode 1" are added to the additional information display area 622. Here, "belonging to" and "description" correspond to setting items included in the document information, and "OCR" and "barcode 1" correspond to parameters indicating output data of the OCR process and the barcode process, respectively.

Figure 9:
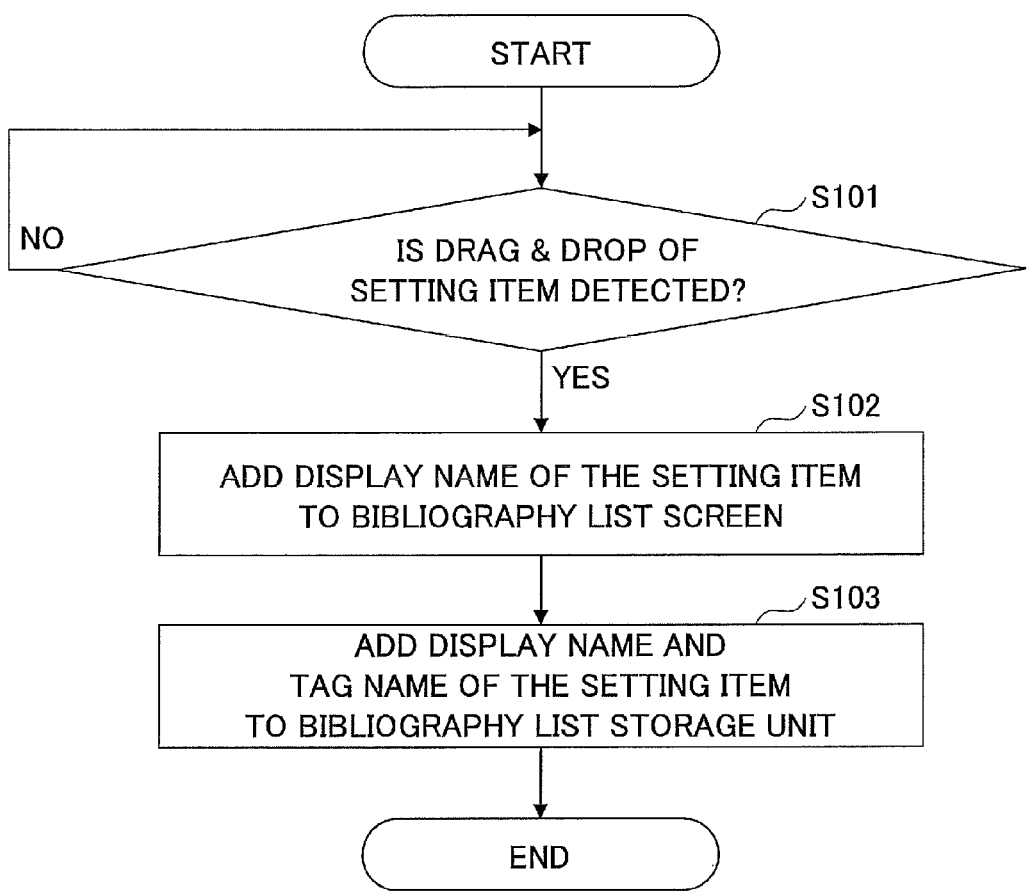
FIG. 9 is a flowchart illustrating an example of a procedure for adding a setting item included in document information to a bibliography list.

In order to add to a bibliography list a setting item corresponding to a line in the document information setting area 611, a process illustrated in FIG. 9, for example, is performed.

FIG. 9 is a flowchart illustrating an example of a procedure for adding a setting item included in document information to a bibliography list.

When the bibliography list management unit 15 detects that a display name of a setting item corresponding to a line in the document information setting area 611 is dragged and dropped into the bibliography list screen 620, a node corresponding to the display name is added in the additional information display area 622 by the bibliography list management unit 15. Next, the bibliography list management unit 15 obtains a tag name of the setting item from the edit information storage unit 122, associates the display name of the setting item with the tag name, and stores them in the bibliography list storage unit 121 (S103). It should be noted that in FIG. 7, an arrow beginning from "belonging to" in the document information setting area 611 and ending at "belonging to" in the bibliography list screen 620 indicates a starting point and an ending point of a drag-and-drop operation. Further, an arrow beginning from "description" in the document information setting area 611 and ending at "description" in the bibliography list screen 620 indicates a starting point and an ending point of another drag-and-drop operation.

FIG. 10 is a drawing illustrating an example of a bibliography list storage unit. As shown in FIG. 10, the bibliography list storage unit 121 stores a display name and a tag name for each bibliographical information item.

Figure 11:
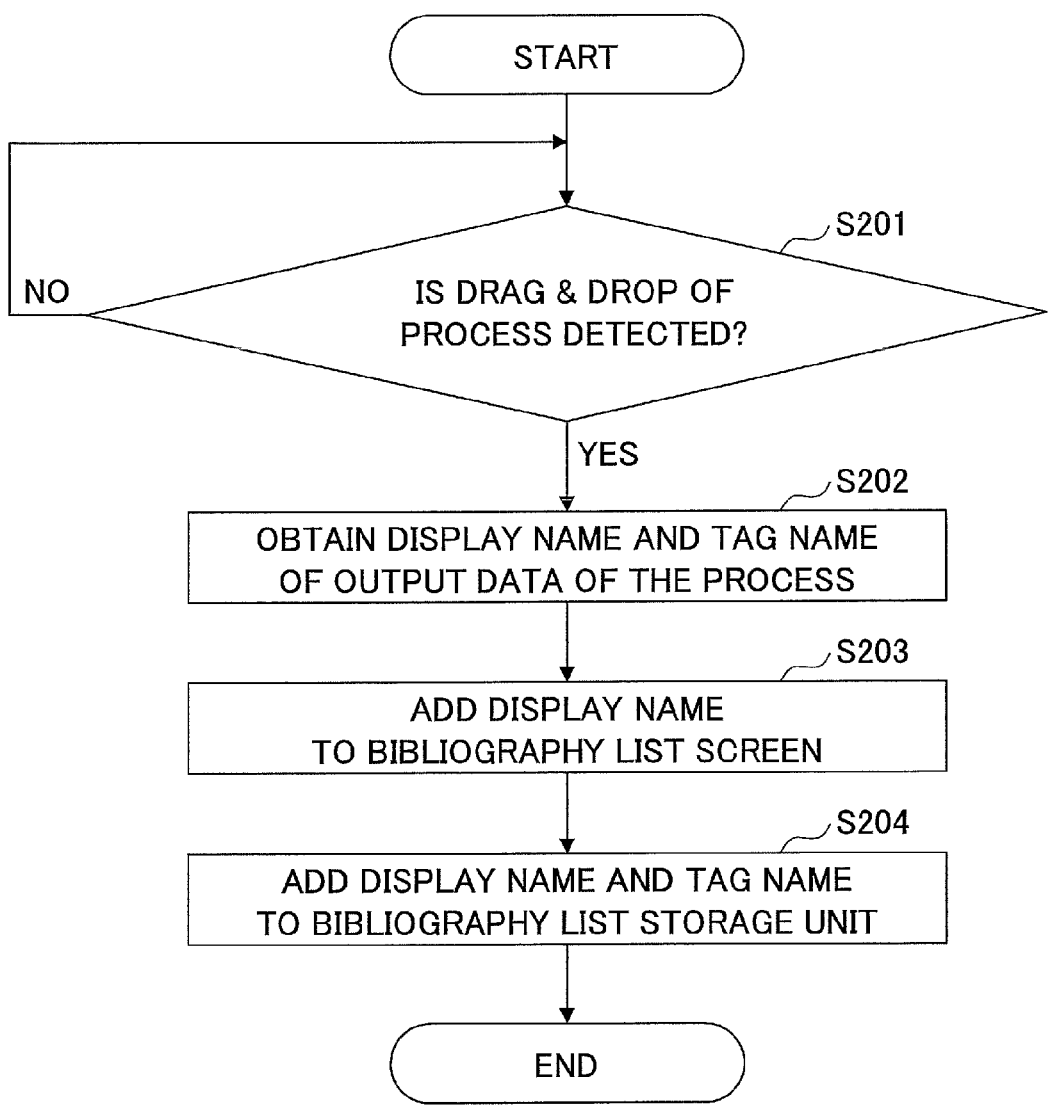
FIG. 11 is a flowchart illustrating an example of a procedure for adding a parameter indicating output data of a process to a bibliography list.

Further, in order to add to a bibliography list a parameter indicating output data of a process shown in the procedure setting area 613, for example, a process illustrated in FIG. 11 is performed.

FIG. 11 is a flowchart illustrating an example of a procedure for adding a parameter indicating output data of a process to a bibliography list.

When the bibliography list management unit 15 detects that an icon of a process in the procedure setting area 613 is dragged and dropped into the bibliography list screen 620 (Yes in S201), the bibliography list management unit 15 obtains a display name and a tag name of a process corresponding to the icon from a processing unit 23 corresponding to the process via a network (S202). In other words, the processing unit 23 includes a display name and a tag name of a parameter indicating output data output by the processing unit 23. The display name and the tag name are obtained in step S202.

It should be noted that the parameters used in the processing unit 23 may include a parameter which is not appropriate to be used as bibliographical information. Parameters included and used by the processing unit 23 in the process execution may include: parameters which can be used (can be added) as the bibliographical information; and parameters which cannot be used as the bibliographical information, both of which may be defined beforehand. Only the parameters that can be used as the bibliographical information may be obtained in step S202.

Next, the bibliography list management unit 15 adds a node corresponding to the obtained display name to the additional information display area 622 (S203). Next, the bibliography list management unit 15 associates the obtained display name with the tag name, and stores them in the bibliography list storage unit 121 (S204). It should be noted that in FIG. 7, an arrow beginning from "OCR process" in the procedure setting area 613 and ending at "OCR process" in the bibliography list screen 620 indicates a starting point and an ending point of a drag-and-drop operation. An arrow beginning from "barcode process" in the procedure setting area 613 and ending at "barcode process" in the bibliography list screen 620 indicates a starting point and ending point of another drag-and-drop operation.

It should be noted that it may be possible to set a target range of an OCR process or a target range of a barcode process in an image area of a scan image for the OCR process or the barcode process. For example, when an icon of an OCR process or an icon of a barcode process is double-clicked in the procedure setting area 613, the process setting unit 14 displays a screen for specifying a range of image processing in the OCR process or the barcode process.

Figure 12:
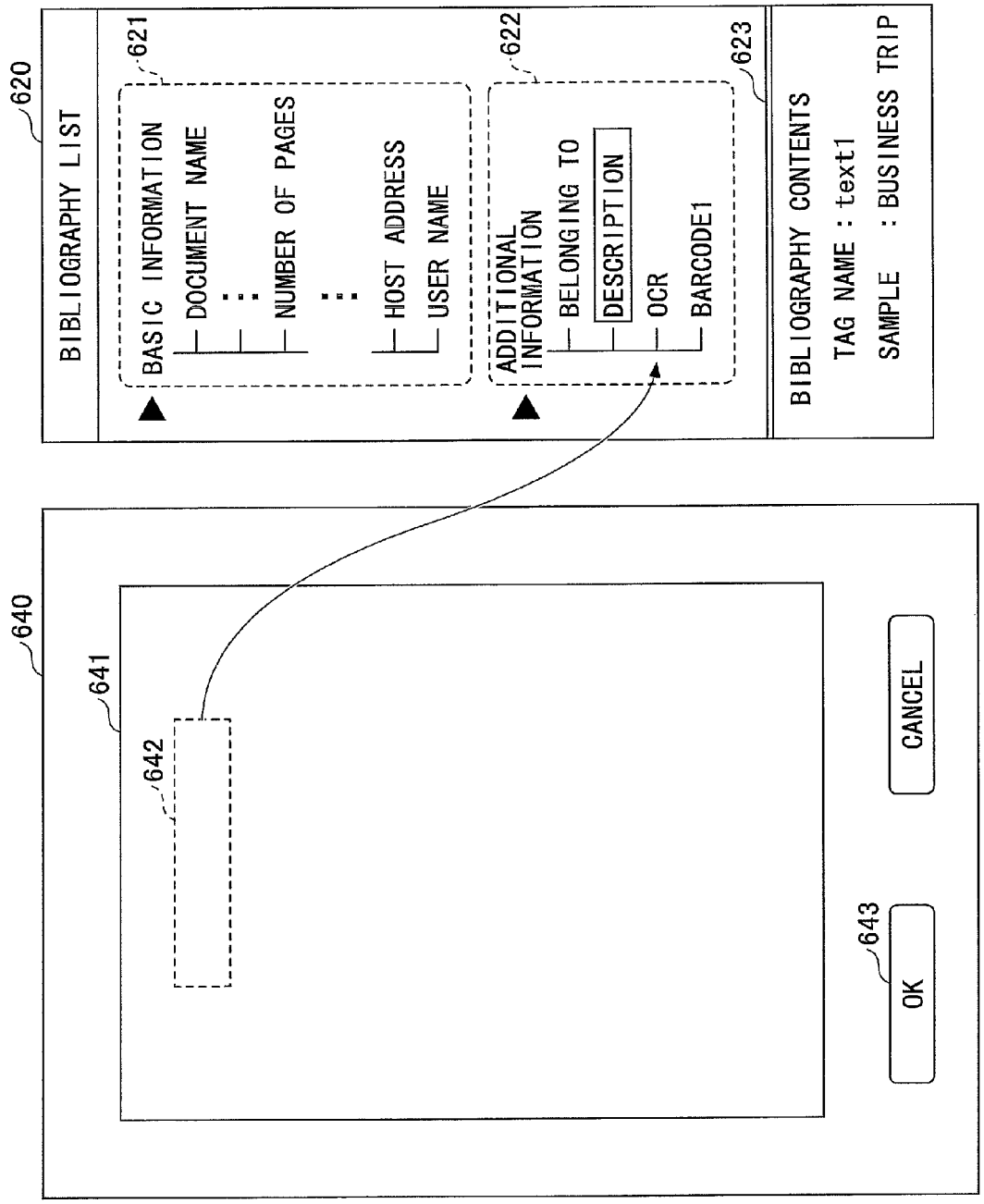
FIG. 12 is a drawing illustrating a range specification screen.

FIG. 12 is a drawing illustrating a range specification screen 640. In FIG. 12, the range specification screen 640 includes an image area 641. In the image area 641, an image of a model of a scan target voucher is shown. A file name of a file storing the image of the model is set beforehand as an item of process information of the process. A user specifies the target area in which a process such as an OCR process is performed by referring to the image of the model. In FIG. 12, an example state is shown in which a range 642 is specified. In this state, as shown by an arrow, the range 642 may be dragged and dropped into the bibliography list screen 620. In this case, the process illustrated in FIG. 11 may be performed. It should be noted that coordinate values of the range 642 are stored as information included in the process information corresponding to the process in the edit information storage unit 122 by the process setting unit 14.

As described above, in the range specification screen 640, a range for performing the OCR process can be specified, the OCR process is performed in the specified range at the time of workflow execution, and characters read from the specified range can be obtained. Further, if a name of the read characters is set (e.g., a document name or a delivery number), the name can be used as a parameter.

It should be noted that the name may be set, for example, in the range specification screen 640 and stored in the edit information storage unit 122 by the process setting unit 14. Specifically, an example method may include clicking the specified range 642, and inputting the name of the range 642 by using a keyboard, etc. In this case, the name becomes a display name and may be shown in the additional information.

In FIG. 12, an example is shown in which only a range 642 is set in the range specification screen 640, but multiple ranges 642 may be specified. It should be noted that names may be set for respective ranges 642. As described above, it is assumed that, in the case where an icon of a process is dragged and dropped into the procedure setting area 613 in FIG. 7, display names and tag names of the multiple parameters may be obtained from the processing unit 23 corresponding to the process (multiple sets of display names and tag names are obtained).

In the case where there are multiple parameters corresponding to a process added to the additional information, the parameters may be shown in a hierarchical structure in the additional information display area 622. In other words, multiple parameters corresponding to the process of an OCR process may be shown in a lower level of an item "OCR". With the above arrangement, a user can understand which parameter corresponds to which process. Further, even if parameters with the same display name are set in multiple processing units 23, a user can understand which parameter corresponds to which processing unit 23.

With respect to a parameter indicating output data of a barcode process, etc., the parameter may be added to a bibliography list with a similar operation. With the above operation, a user can include output data of a process in the bibliography list with a further intuitive operation.

The bibliographical information item added to the bibliography list screen 620 can be referred to as a setting value of a setting item of a process whose icon is shown in the procedure setting area 613 in FIG. 7.

For example, in the procedure setting area 613 in FIG. 7, when an icon of "mail delivery" is double-clicked, the process setting unit 14 displays a setting screen of process information related to "mail delivery" (hereinafter, referred to as "mail delivery setting screen") superimposed onto the flow definition edit screen 610.

Figure 13:
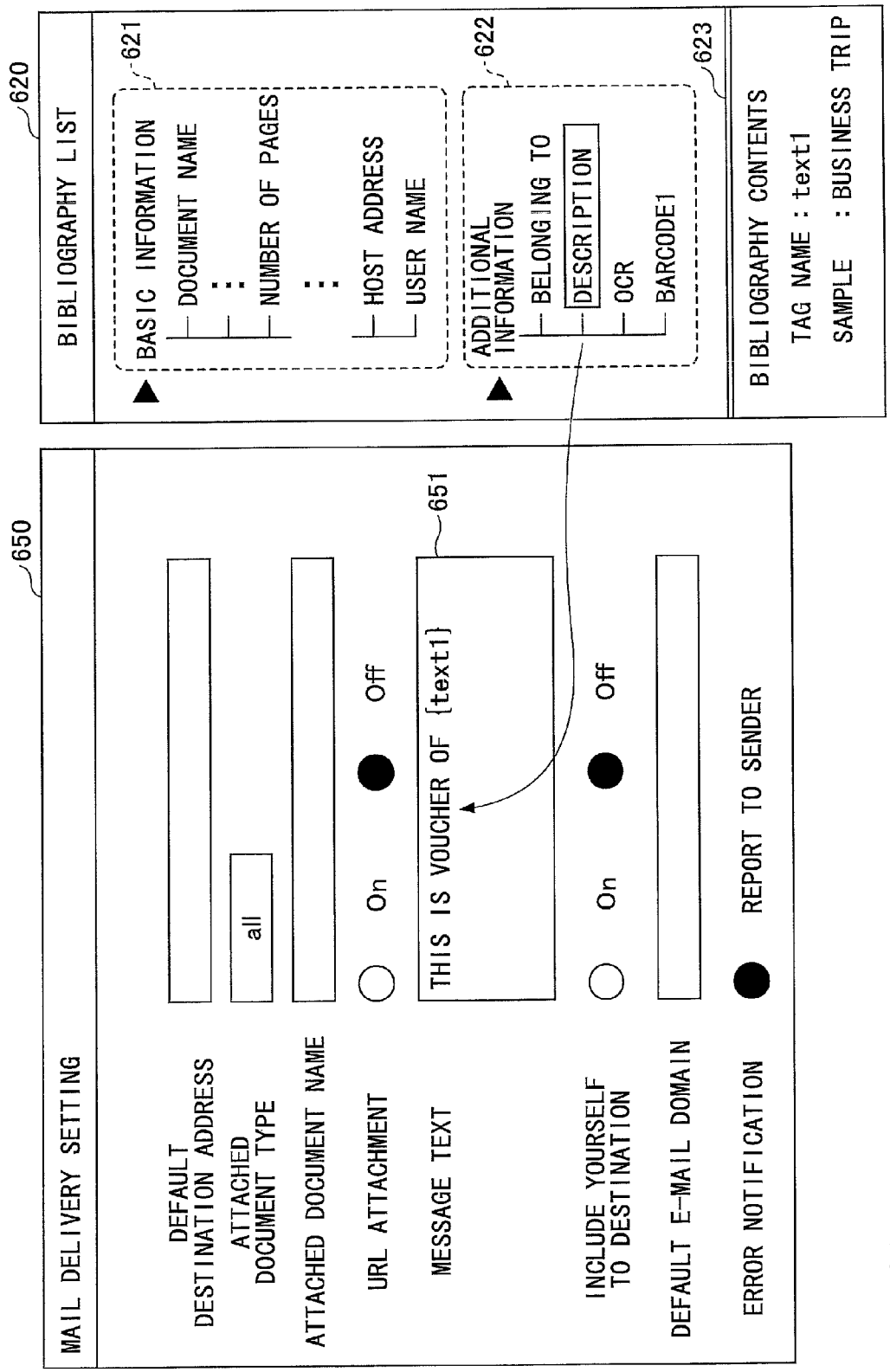
FIG. 13 is a drawing illustrating a display example of a mail delivery setting screen.

FIG. 13 is a drawing illustrating a display example of a mail delivery setting screen 650. In FIG. 13, the mail delivery setting screen 650 includes a setting area for each of the setting items included in the process information of the mail delivery process. For example, a setting area 651 is an area for setting a message text of email to be delivered.

Figure 14:
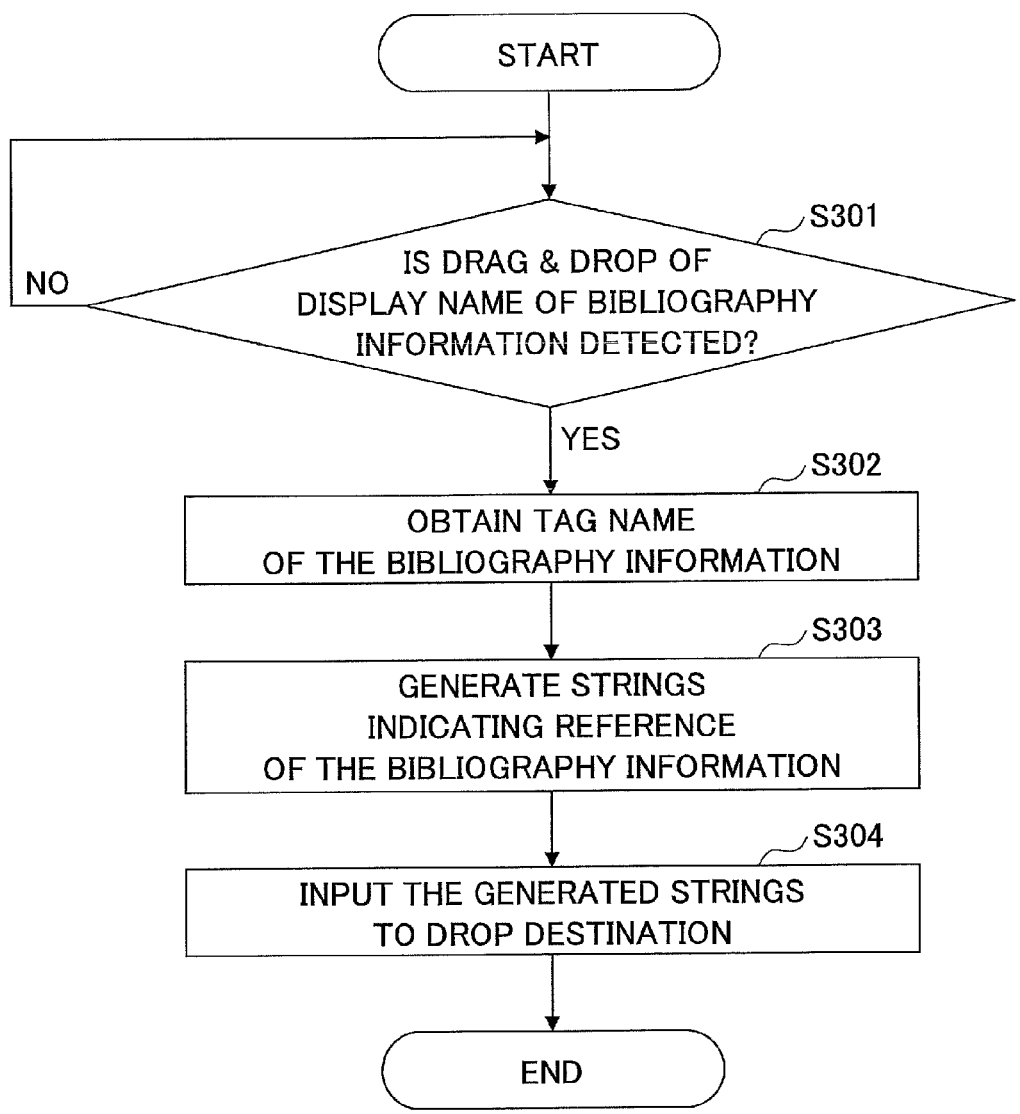
FIG. 14 is a flowchart illustrating an example of a procedure which is performed in order to refer to bibliographic information.

In the case where a bibliographical information item shown in the bibliography list screen 620 is referred to as a value of the setting area 651, a process illustrated in FIG. 14, for example, is performed.

FIG. 14 is a flowchart illustrating an example of a procedure which is performed for referring to a bibliographical information item.

When the bibliography expansion unit 16 detects that a display name shown in the bibliography list screen 620 is dragged and dropped into the setting area 651 (Yes in S301), the bibliography expansion unit 16 obtains a tag name of the bibliographical information item corresponding to the display name from the bibliography list storage unit 121 (FIG. 10) (S302).

Next, the bibliography expansion unit 16 generates a character string which indicates that the bibliographical information item (a value of a parameter, a value of a setting item, or output data) is referred to as a setting value (S303). In an embodiment of the present invention, the character string has a form of "{tag name}". Next, the bibliography expansion unit 16 expands (inputs) the generated character string to a drop destination (S304).

FIG. 13 shows an example in which "description" in the bibliography list screen 620 is dragged and dropped into the setting area 651. As a result, a character string "{text1}" which includes a tag name ("text1") corresponding to "description" is input to the setting area 651. In this case, at the time of workflow execution, a portion "{text1}" is replaced by a value input by a user for "description" in a setting screen displayed at the starting time of the workflow. The replacement is performed by the mail delivery processing unit 23c. Further, when "OCR" in the bibliography list screen 620 is dragged and dropped into the setting area 651, "{ocrData_01}" is input to the setting area 651. In this case, at the time of workflow execution, a portion "{ocrData_01}" is replaced by text data obtained as a result of the OCR process by the OCR processing unit 23a.

It should be noted that the drag-and-drop operation may be performed after "THIS IS" has been input to the setting area 651, or may be performed after "THIS IS VOUCHER." has been input to the setting area 651. In the former case, the bibliography expansion unit 16 inputs "{text1}" to the end of the character string which has already been input to the drop destination. In the latter case, the bibliography expansion unit 16 inputs "{text1}" to the drop destination position in the character string.

Further, the drag-and-drop operation is just an example of an operation to be applied to the setting area 651. For example, in the case where a display name shown in the bibliography list screen 620 is double-clicked in a state where a cursor is in the setting area 651, the character string indicating reference of the bibliographical information item corresponding to the display name may be input to the setting area 651. Further, the same result may be obtained by another operation. Similarly, an operation other than the drag-and-drop operation may also be used for adding a bibliographical information item to the bibliography list screen 620.

Further, an operation of a user may be performed by using other than a mouse or a keyboard. For example, in the case where the operation terminal 10 includes a touch panel, the drag-and-drop operation may be performed by using the touch panel.

Further, the drop destination of the display name of the bibliographical information item is not limited to a setting area of a setting item of the mail deliver process. The drop destination of the display name of the bibliographical information may be a setting area of a setting screen related to another process.

Further, in FIG. 7, FIG. 12, and FIG. 13, the bibliography list screen 620 further includes a bibliography content display area 623. The bibliography content display area 623 is an area where a tag name, a sample value, etc., of the bibliographical information item selected in the bibliography list screen 620 are shown. The sample value is an example of a value of the selected bibliographical information item. A user may be able to guess, based on the display name of the bibliographical information item, what value a parameter or a setting item corresponding to the display name has, or what output data the display name corresponds to. But it is difficult to verify whether the guess is right. Therefore, in an embodiment of the present invention, a sample value is shown so that the user can verify whether the guess is right. By referring to the sample value, the user can verify that the bibliographical information item has a value as the user has guessed. Further, in the case where the sample value of a bibliographical information item is different from the value the user has guessed, the user can avoid referring to a wrong bibliographical information item as a value of a setting item of a process.

Figure 15:
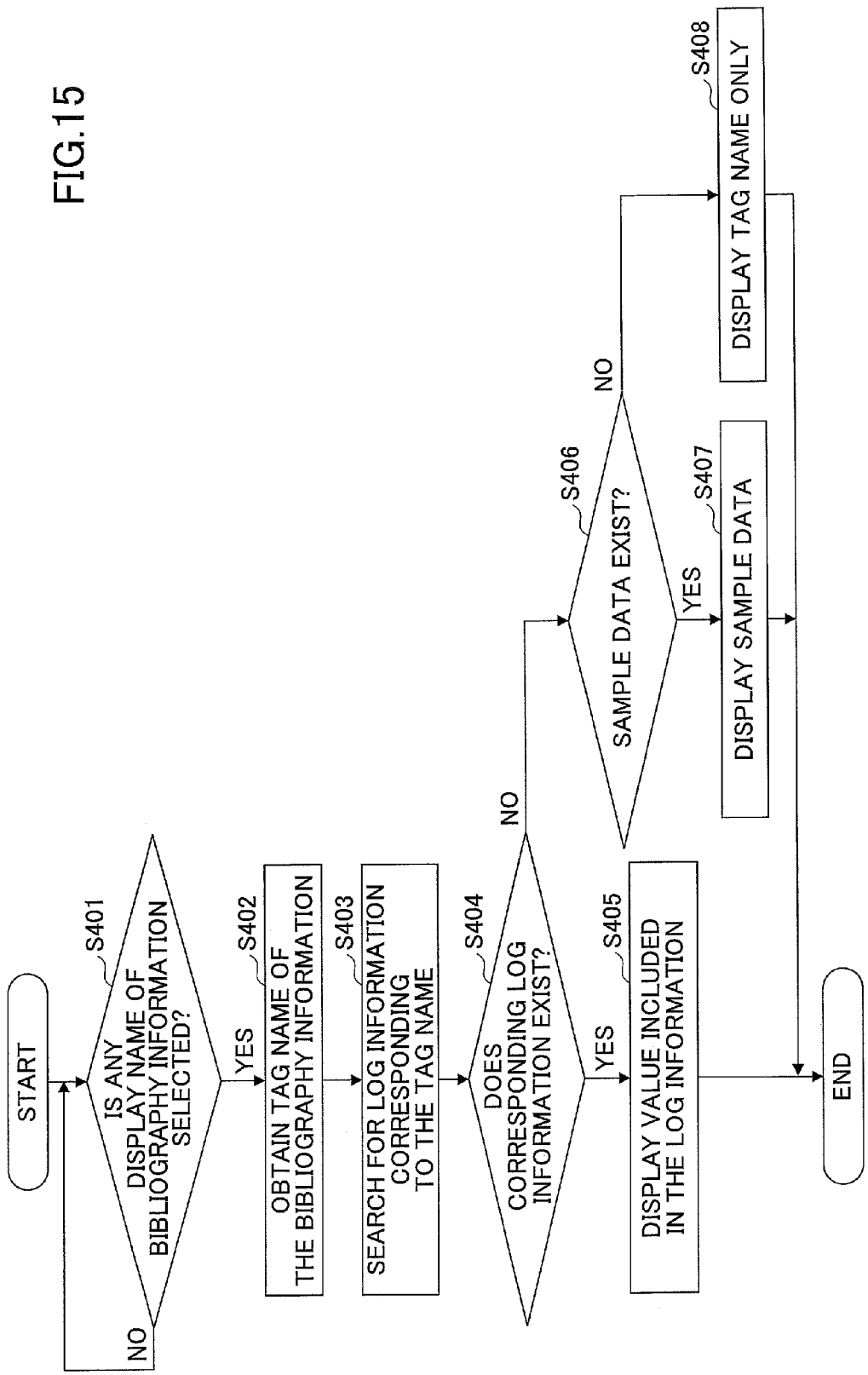
FIG. 15 is a flowchart illustrating an example of a procedure of a display processing of bibliography content.

The display of the bibliography content display area 623 is realized by, for example, having the sample display unit 18 perform a process illustrated in FIG. 15.

FIG. 15 is a flowchart illustrating an example of a procedure of a display process of bibliographic content.

When the sample display unit 18 detects that a display name in the bibliography list screen 620 is selected (Yes in S401), the sample display unit 18 obtains a tag name of the bibliographical information item corresponding to the display name from the bibliography list storage unit 121 (FIG. 10) (S402). Next, the sample display unit 18 searches log information of flow jobs stored in the log storage unit 27 via the flow definition generation unit 21 of the flow management server 20 for log information including the tag name (S403).

The log information includes a flow ID of a workflow related to a flow job, values of parameters of basic information of the flow job, values of setting items of document information of the flow job, output data of each of the processes of the flow job, etc., each of which is associated with a corresponding tag name. It should be noted that the latest log information of the corresponding log information may be searched for. Further, in the case where the editing work of flow definition information is a modification of a part of existing flow definition information, there is a good likelihood that the flow job related to the existing flow definition information was performed in the past. In this case, it is possible to limit the search target to the log information which includes the flow ID of the most current editing flow definition information.

In the case where the searched for log information is found (Yes in S404), the sample display unit 18 displays the tag name of the bibliographic information item corresponding to the selected display name and a value associated with the tag name in the found log information in the bibliography content display area 623 (S405). In this case, the value associated with the tag name is displayed as a sample value.

In the case where the searched for log information is not found (No in S404), the sample display unit 18 determines whether there is sample data for the tag name (S406). For example, in the basic information and the document information, sample data of parameters or setting items may be set beforehand as attribute information of the parameters or the setting items. Further, the processing units 23 may include sample data of output data of the corresponding processing units 23. In this case, the sample display unit 18 searches the basic information and the document information for attribute information of a parameter or a setting item corresponding to the tag name, and determines whether the attribute information includes sample data. Further, in the case where the tag name corresponds to a parameter indicating output data of a process, the sample display unit 18 may request the processing unit 23 corresponding to the process for the sample data. It should be noted that the tag name corresponding to a parameter indicating output data of a process may include identification information of the process. With the above arrangement, it becomes easy to determine which process the tag name corresponds to.

In the case where the sample data can be obtained (Yes in S406), the sample display unit 18 displays the tag name of the bibliographical information item corresponding to the selected display name and the obtained sample data in the bibliography content display area 623 (S407). In this case, the sample data are displayed as a sample value.

In the case where the sample data cannot be obtained (No in S406), the sample display unit 18 displays only the tag name of the bibliographical information item corresponding to the selected display name in the bibliography content display area 623 (S408).

Referring to FIG. 13, a modified example will be described. The additional information display area 622 of the bibliography list screen 620 may be displayed as shown in FIG. 16 in the case where multiple ranges are set as a target of an OCR process, names are given to corresponding ranges, and the ranges are dragged and dropped into the additional information display area 622 of the bibliography list screen 620 as described referring to FIG. 12.

Figure 16:
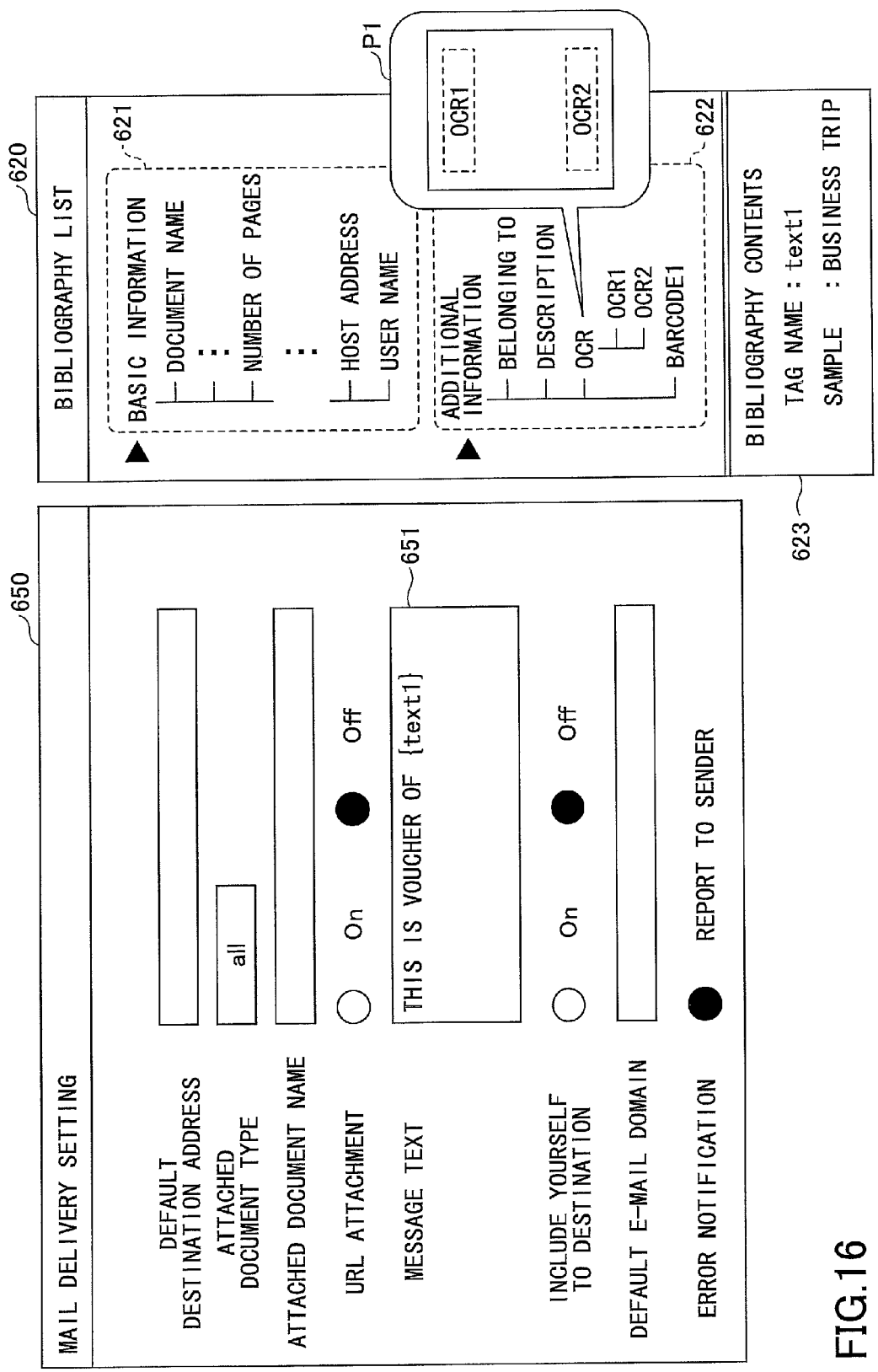
FIG. 16 is a drawing illustrating a modified example of a bibliography list screen.

FIG. 16 is a drawing illustrating a modified example of a bibliography list screen. In the additional information display area 622 shown in FIG. 16, child nodes of "OCR1" and "OCR2" belong to the node corresponding to "OCR". "OCR1" and "OCR2" are nodes whose display names are the names given to the corresponding ranges of the OCR process. In this case, "OCR" which is a parent node of the child nodes may be displayed in a manner different from other nodes such as in bold. Existence of child nodes may be represented by displaying in bold. In other words, "OCR1" and "OCR2" may be displayed when "OCR" is double-clicked.

For example, when "OCR1" or "OCR2" is dragged and dropped into the setting area 651, a character string including a tag name corresponding to "OCR1" or "OCR2" (e.g., "{ocrData_01}" or "{ocrData_02}") is input to the setting area 651. Further, when the parent node "OCR" is dragged and dropped into the setting area 651, two character strings including corresponding tag names of the two child nodes may be input to the setting area 651.

Further, FIG. 16 shows an example in which a preview P1 is displayed. The preview P1 may be displayed, for example, in the case where a cursor is positioned at any one of "OCR", "OCR1", and "OCR2", or in the case where any one of them is clicked. In the preview P1, an image indicating the ranges OCR1 and OCR2 is displayed. The image is generated based on the range specification screen 640 obtained from the OCR processing unit 23a. In other words, a setting screen when the bibliographical information is set is obtained from a processing unit 23 specified in the additional information, and a preview image generated based on the obtained setting screen is displayed.

By having the preview P1 displayed, it is possible for a user to visually understand the ranges "OCR1" and "OCR2". It should be noted that in the preview P1, a range corresponding to "OCR1" or "OCR2" may be dragged and dropped into the setting area 651. In this case, the similar effect as in the case where the node "OCR1" or the node "OCR2" in the additional information display area 622 is dragged and dropped into the setting area 651 may be obtained. Further, the entire preview P1 (or an area other than the range "OCR1" or the range "OCR2") may be dragged and dropped into the setting area 651. In this case, the similar effect as in the case where the node "OCR" in the additional information display area 622 is dragged and dropped into the setting area 651 may be obtained.

As described above, according to an embodiment of the present invention, by operating a display element in the flow definition edit screen 610, the bibliography list screen 620, or the like, a value of a bibliographical information item corresponding to the display element can be referred to as a value of a setting item of a process. Therefore, it is possible to simplify a setting operation for referring to a dynamic value as a setting value of a process included in a workflow.

Further, in an embodiment of the present invention, the bibliographic information items used for reference-form setting values of processes are gathered and controlled in the bibliography list screen 620. As a result, reference target choices are gathered in the bibliography list screen 620, and it is easy for a user to find desired bibliographic information. Further, for example, in the case where the flow definition edit screen 610 cannot be operated when the mail delivery setting screen 650 is displayed, a value of a bibliographical information item which has been displayed in the flow definition edit screen 610 can be referred to in the mail delivery setting screen 650.

It should be noted that in an embodiment of the present invention, the operation terminal 10 is an example of an information processing apparatus and a first information processing apparatus. The bibliography list management unit 15 is an example of an item management unit. The bibliography expansion unit 16 is an example of an input unit. The document information setting area 611 is an example of a first screen. The bibliography list screen 620 is an example of a second screen. The mail delivery setting screen 650 is an example of a third screen. The procedure setting area 613 is an example of a fourth screen. The range specification screen 640 is an example of a fifth screen. The flow management server 20 is an example of a second information processing apparatus.

As described above, embodiments of the present invention have been described in detail. The present invention is not limited to the specific embodiments and various variations and modifications can be made within the scope of the present invention described in the claims.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An information processing apparatus comprising:
an item management unit, implemented by a CPU and memory, that displays a first screen including a list of parameters whose values are input during execution of a workflow for an image forming apparatus,
when a first drag-and-drop operation is performed for a first parameter of the parameters, the item management unit includes a first item corresponding to the first parameter in a second screen; and
an input unit, implemented by the CPU and the memory, that applies the first item in the second screen to a setting area of a third screen for setting a value of a second parameter for a first process of the workflow,
the input unit applies the first item to the setting area in response to a second drag-and-drop operation, by inserting a first character string into the setting area that references the first parameter, causing the second parameter to be based on the first parameter,
wherein when a third drag-and-drop operation is performed for a display element corresponding to a second process of the processes in a fourth screen for setting a procedure relationship of the processes of the workflow, the item management unit includes a second item corresponding to output data of the second process in the second screen,
wherein when a fourth drag-and-drop operation is performed for applying the second item corresponding to the output data included in the second screen to a setting area of a value of a third parameter of a third process of the processes of the workflow included in the third screen, the input unit inputs a second character string to the setting area of the value of the third parameter, the second character string indicating that the output data corresponding to the second item is referred to as the value of the third parameter, and
the input unit directs the image forming apparatus to perform a workflow process comprising scanning a physical document to generate a scan image, based on the second parameter.

2. The information processing apparatus according to claim 1,
wherein when a fifth drag-and-drop operation is performed for setting a process target range of an image area of image data for a fourth process of the processes related to image processing of the image data input to the workflow in a fifth screen, the item management unit includes a third item corresponding to the range in the second screen, and
wherein when a sixth operation is performed for applying the third item corresponding to the range included in the second screen to a setting area of a value of a fourth parameter of a fifth process of the processes of the workflow included in the third screen, the input unit inputs a third character string to the setting area of the value of the fourth parameter, the third character string indicating that data obtained by the image processing for the range corresponding to the third item is referred to as the value of the fourth parameter.

3. The information processing apparatus according to claim 1,
wherein the second drag-and-drop operation is performed by clicking on the first item, dragging the first item to the setting area, and releasing the first item.

4. An information processing system comprising:
a first information processing apparatus, implemented by a CPU and memory, that generates definition information for a workflow for an image forming apparatus, the first information processing apparatus including:
an item management unit that displays a first screen including a list of parameters whose values are input during execution of the workflow,
when a first drag-and-drop operation is performed for a first parameter of the parameters, the item management unit includes a first item corresponding to the first parameter in a second screen; and
an input unit, implemented by the CPU and the memory, that applies the first item in the second screen to a setting area of a third screen for setting a value of a second parameter for a first process of the workflow,
the input unit applies the first item to the setting area in response to a second drag-and-drop operation, by inserting a first character string into the setting area that references the first parameter, causing the second parameter to be based on the first parameter; and
a second information processing apparatus, implemented by a CPU and memory, that executes the workflow based on the definition information,
wherein when a third drag and drop operation is performed for a display element corresponding to a second process of the processes in a fourth screen for setting a procedure relationship of the processes of the workflow, the item management unit includes a second item corresponding to output data of the second process in the second screen,
wherein when a fourth drag and drop operation is performed for applying the second item corresponding to the output data included in the second screen to a setting area of a value of a third parameter of a third process of the processes of the workflow included in the third screen, the input unit inputs a second character string to the setting area of the value of the third parameter, the second character string indicating that the output data corresponding to the second item is referred to as the value of the third parameter, and the input unit directs the image forming apparatus to perform a workflow process comprising scanning a physical document to generate a scan image, based on the second parameter.

5. The information processing system according to claim 4, wherein when a fifth drag and drop operation is performed for setting a process target range of an image area of image data for a fourth process of the processes related to image processing of the image data input to the workflow in a fifth screen, the item management unit includes a third item corresponding to the range in the second screen, and wherein when a sixth drag and drop operation is performed for applying the third item corresponding to the range included in the second screen to a setting area of a value of a fourth parameter of a fifth process of the processes of the workflow included in the third screen, the input unit inputs a third character string to the setting area of the value of the fourth parameter, the third character string indicating that data obtained by the image processing for the range corresponding to the third item is referred to as the value of the fourth parameter.

6. The information processing system according to claim 4, wherein the second drag-and-drop is performed by clicking on the first item, dragging the first item to the setting area, and releasing the first item.

7. An information processing method implemented by a CPU and memory, the information processing method comprising:

displaying a first screen including a list of parameters whose values are input during execution of a workflow for an image forming apparatus;

when a first drag-and-drop operation is performed for a first parameter of the parameters, including a first item corresponding to the first parameter in a second screen; and in response to a second drag-and-drop operation, applying the first item in the second screen to a setting area of a third screen for setting a value of a second parameter for a first process of the workflow, by inserting a first character string into the setting area that references, the input unit directs the image forming apparatus to perform a workflow process comprising scanning a physical document to generate a scan image, based on the second parameter, when a third drag-and-drop operation is performed for a display element corresponding to a second process of the processes in a fourth screen for setting a procedure relationship of the processes of the workflow, including a second item corresponding to output data of the second process in the second screen; and when a fourth drag-and-drop operation is performed for applying the second item corresponding to the output data included in the second screen to a setting area of a value of a third parameter of a third process of the processes of the workflow included in the third screen, inputting a second character string to the setting area of the value of the third parameter, the second character string indicating that the output data corresponding to the second item is referred to as the value of the third parameter.

8. The information processing method according to claim 7, further comprising:

when a fifth drag-and-drop operation is performed for setting a process target range of an image area of image data for a fourth process of the processes related to image processing of the image data input to the workflow in a fifth screen, including a third item corresponding to the range in the second screen; and when a sixth drag-and-drop operation is performed for applying the third item corresponding to the range included in the second screen to a setting area of a value of a fourth parameter of a fifth process of the processes of the workflow included in the third screen, inputting a third character string to the setting area of the value of the fourth parameter, the third character string indicating that data obtained by the image processing for the range corresponding to the third item is referred to as the value of the fourth parameter.

9. The information processing method according to claim 7, wherein the second drag-and-drop operation is performed by clicking on the first item, dragging the first item to the setting area, and releasing the first item.

* * * * *